(12) United States Patent
Hartwich et al.

(10) Patent No.: US 8,484,390 B2
(45) Date of Patent: Jul. 9, 2013

(54) MESSAGE HANDLER AND METHOD FOR CONTROLLING ACCESS TO DATA OF A MESSAGE MEMORY OF A COMMUNICATIONS MODULE

(75) Inventors: Florian Hartwich, Reutlingen (DE);
Christian Horst, Dusslingen (DE);
Franz Bailer, Reutlingen (DE); Markus Ihle, Jettenburg (DE)

(73) Assignee: Robert Bosch GmbH, Stuttgart (DE)

( * ) Notice: Subject to any disclaimer, the term of this patent is extended or adjusted under 35 U.S.C. 154(b) by 868 days.

(21) Appl. No.: 11/659,311

(22) PCT Filed: Jun. 29, 2005

(86) PCT No.: PCT/EP2005/053074
§ 371 (c)(1),
(2), (4) Date: Dec. 3, 2008

(87) PCT Pub. No.: WO2006/015910
PCT Pub. Date: Feb. 16, 2006

(65) Prior Publication Data
US 2009/0083466 A1 Mar. 26, 2009

(30) Foreign Application Priority Data
Aug. 5, 2004 (DE) .......................... 10 2004 038 211

(51) Int. Cl.
*G06F 5/00* (2006.01)
(52) U.S. Cl.
USPC .............................. 710/52; 710/310; 710/240
(58) Field of Classification Search
USPC ............... 710/36, 38, 39, 45, 51, 52, 56, 305, 710/309, 310, 316, 317, 240, 241, 244
See application file for complete search history.

(56) References Cited

U.S. PATENT DOCUMENTS 5,325,487 A * 6/1994 Au et al. ........................ 711/131
5,471,588 A 11/1995 Nimishakavi et al.
(Continued)

FOREIGN PATENT DOCUMENTS
EP 0 843 854 5/1998
EP 1 787 204 5/2007
(Continued)

OTHER PUBLICATIONS

FlexRay, <http://en.wikipedia.org/wiki/FlexRay>, accessed on Jun. 8, 2010.*

*Primary Examiner* — Khanh Dang
(74) *Attorney, Agent, or Firm* — Kenyon & Kenyon LLP

(57) ABSTRACT

A method for controlling access to data of a message memory, and a message handler of a communications module having a message memory, in which data are input or output in response to an access; the message memory being connected to a first buffer configuration and a second buffer configuration, and the data being accessed via the first or the second buffer configuration; in the message handler, at least one first finite state machine being provided which controls the access to the message memory via the first buffer configuration, and at least one second finite state machine being provided which controls the access via the second buffer configuration, the at least one first finite state machine and the second finite state machine making access requests; and a third finite state machine being provided which assigns access to the message memory to the at least one first and the second finite state machine as a function of their access requests.

14 Claims, 11 Drawing Sheets

U.S. PATENT DOCUMENTS

| | | | |
|---|---|---|---|
| 5,765,036 A | 6/1998 | Lim et al. | |
| 5,983,327 A | 11/1999 | Achilles et al. | |
| 7,596,153 B2 * | 9/2009 | Paulitsch et al. | 370/503 |
| 7,599,377 B2 * | 10/2009 | Jordan et al. | 370/400 |
| 7,602,779 B2 * | 10/2009 | Kato et al. | 370/389 |
| 7,725,230 B2 * | 5/2010 | Knoefler et al. | 701/48 |
| 2005/0262327 A1 * | 11/2005 | Yoshimoto | 711/202 |

FOREIGN PATENT DOCUMENTS

| | | |
|---|---|---|
| JP | 8272672 | 10/1996 |
| JP | 11510285 | 9/1999 |
| RU | 2282310 | 8/2006 |
| WO | WO 97/06489 | 2/1997 |
| WO | WO 2006/015910 | 2/2006 |

* cited by examiner

MESSAGE HANDLER AND METHOD FOR CONTROLLING ACCESS TO DATA OF A MESSAGE MEMORY OF A COMMUNICATIONS MODULE

FIELD OF THE INVENTION

The present invention relates to a message handler and a method for controlling access to data of a message memory of a communications module.

BACKGROUND INFORMATION

The networking of control units, sensor systems and actuator systems with the aid of a communications system and a bus system, thus a communications link, has increased dramatically in recent years in the construction of modern motor vehicles or also in machine construction, especially in the field of machine tools, thus in automation, as well. In this context, synergistic effects may be achieved by the distribution of functions to a plurality of control units. These are called distributed systems. The communication between different stations is taking place more and more via a bus system, thus a communications system. Communication traffic on the bus system, access and reception mechanisms, as well as error handling are regulated by a protocol. One conventional protocol for this purpose is the CAN protocol or also the TTCAN protocol, as well as the FlexRay protocol, the FlexRay protocol specification V2.0 presently being the basis. The FlexRay is a rapid, deterministic and fault-tolerant bus system, particularly for use in a motor vehicle. The FlexRay protocol operates according to the method of Time Division Multiple Access (TDMA), in which the components, thus the users or the messages to be transmitted, are assigned fixed time slots in which they have an exclusive access to the communications link. This is comparably implemented in the case of the TTCAN, as well. In this context, the time slots repeat in a fixed cycle, so that the instant at which a message is transmitted via the bus can be predicted exactly, and the bus access takes place deterministically. To optimally utilize the bandwidth for the message transmission on the bus system, the FlexRay subdivides the cycle into a static and a dynamic portion. The fixed time slots are in the static portion at the beginning of a bus cycle. In the dynamic portion, the time slots are assigned dynamically. Therein, the exclusive bus access is now in each case permitted for only a brief time, so-called minislots. The time slot is lengthened by the necessary time only if a bus access takes place within a minislot. Consequently, bandwidth is used up only if it is also actually needed. FlexRay communicates via two physically separate lines with a data rate of a maximum of 10 MB per second each. The two channels correspond to the physical layer, in particular of the OSI (open system architecture) layer model. They are now used chiefly for the redundant and therefore fault-tolerant transmission of messages, but can also transmit different messages, whereby the data rate would then double. However, FlexRay can also be operated with lower data rates.

To realize synchronous functions and to optimize the bandwidth by small spacings between two messages, the distributed components in the communication network, thus the users, need a common time base, the so-called global time. For the clock synchronization, synchronization messages are transmitted in the static portion of the cycle, the local clock time of a component being corrected with the aid of a special algorithm according to the FlexRay specification in such a way that all local clocks run synchronously with respect to one global clock. This synchronization is accomplished comparably in a TTCAN network, as well.

A FlexRay network node or FlexRay user or host contains a user processor, thus the host processor, a FlexRay controller or communication controller, as well as a bus guardian in the case of bus monitoring. In this context, the host processor, thus the user processor, furnishes and processes the data, which are transmitted via the FlexRay communication controller. Messages or message objects can be configured with, e.g., up to 254 data bytes for the communication in a FlexRay network. To now transmit these messages or message objects between the physical layer, i.e., the communications link, and the host processor, a communications module, in particular, a communication controller, is used.

The object of the present invention is now to control the data transmission in such a way that data integrity is ensured, and the transmission rate is optimized.

SUMMARY

The present invention is based on a message handler of a communications module having a message memory, in which data are input or output in response to an access, and a method for controlling access to the data of the message memory. The message memory is connected to one first buffer configuration and one second buffer configuration, the data being accessed via the first or the second buffer configuration. The message handler advantageously includes at least one first state machine or finite state machine which controls the access to the message memory via the first buffer configuration, and at least one second finite state machine or state machine which controls the access via the second buffer configuration. The at least one first finite state machine and the at least one second finite state machine adapted to make access requests. A third finite state machine or state machine is also provided which assigns access to the message memory to the at least one first and the second state machine or finite state machine as a function of their access requests.

That is, the present invention relates to a method and a device for the transfer of data between a message memory, thus a message RAM, and input and output buffers, as well as between the message memory and the transmit and receive units to the communications bus, to thus control that the required data integrity and the high data transfer rate of the messages to be stored are ensured.

Controlled by the message handler, the data are expediently transmitted via the first buffer configuration in two data paths having in each case two data directions, the first buffer configuration containing a first buffer for a first data path and a second buffer for a second data path; and one first state machine or finite state machine is provided per data path, so that two state machines result for the first buffer configuration, each of the two first state machines or finite state machines controlling the access to the message memory via one buffer each.

A clock-pulse arrangement is advantageously provided, by which the data are transmitted in a specifiable clock-pulse period, the third state machine or finite state machine accordingly assigning clock-pulse periods one after another to each first finite state machine and each second finite state machine as a function of their access requests.

Depending upon a number of simultaneous access requests, the total access time is advantageously distributed uniformly by the third finite state machine or state machine in accordance with the number, only one access request ever being permissible simultaneously per finite state machine, thus state machine, to which the clock-pulse periods are distributed.

The example method and the message handler, as well as a corresponding communications module having such a message handler, permit the host CPU to read or to write any message object at all; thus, any message in the message memory during running operation without the selected message object being blocked from participation in the data exchange on the two channels, e.g., of a FlexRay bus, thus the data exchange on the physical layer, for the duration of the access by the host CPU. At the same time, due to the interleaving of the accesses with clock-pulse timing, the integrity of the data stored in the message memory is guaranteed and a high transmission rate is ensured.

BRIEF DESCRIPTION OF THE DRAWINGS

The present invention is explained in greater detail with reference to the following figures.

The present invention is explained below, in light of the exemplary embodiments.

DETAILED DESCRIPTION OF EXAMPLE EMBODIMENTS

Figure 1:
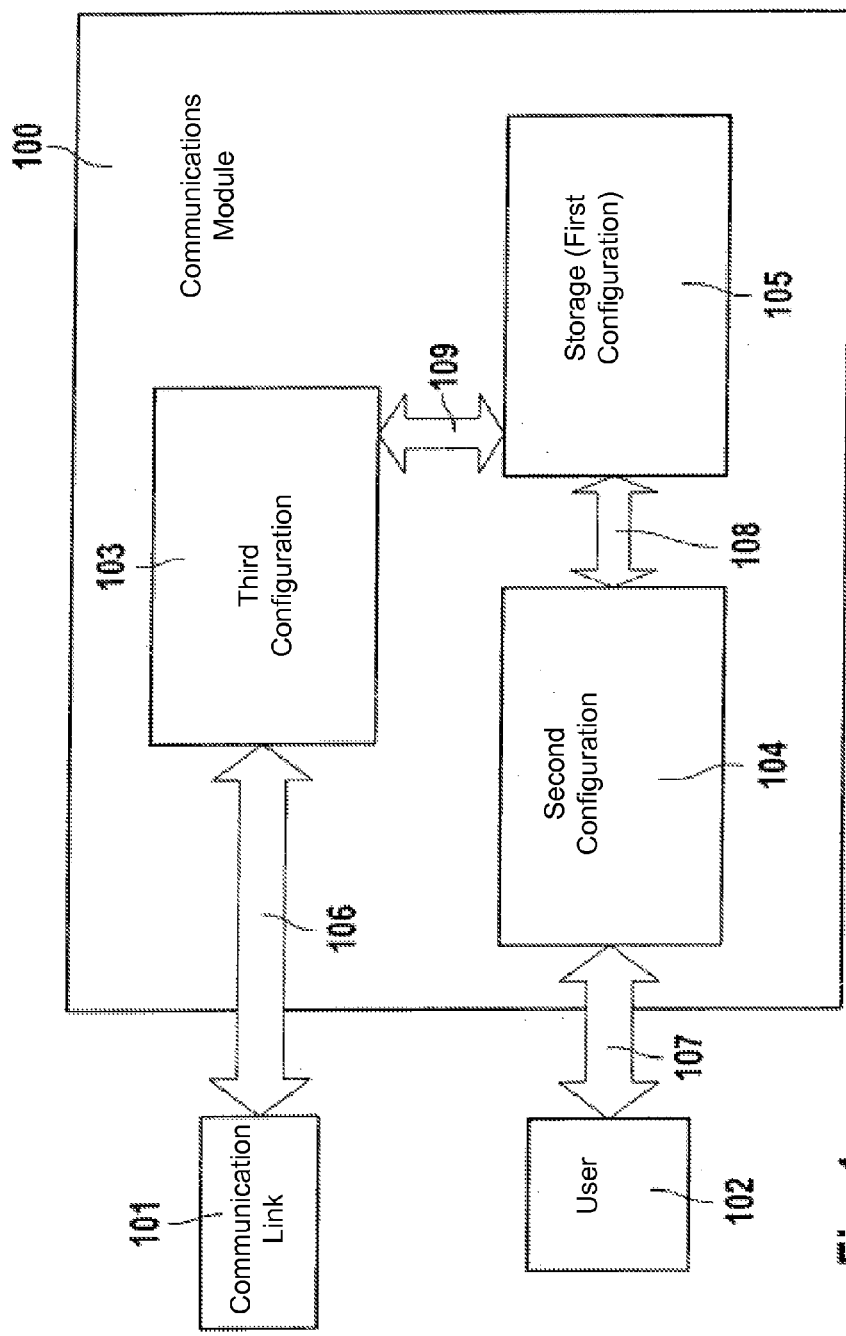
FIG. 1 shows a schematic representation of the communications module and its connection to the physical layer, thus the communications link and the communication or host user.

FIG. 1 shows schematically a FlexRay communications module 100 for connecting a user or host 102 to a FlexRay communications link 101, thus the physical layer of the FlexRay. To that end, FlexRay communications module 100 is connected via a connection 107 to the user or user processor 102, and via a connection 106 to communications link 101. For problem-free connection first of all with respect to transmission times, and secondly with respect to the data integrity, three configurations are schematically differentiated in the FlexRay communications module. In this context, a first configuration 105 is used for storage, in particular as a clipboard, of at least a portion of the messages to be transmitted. Between user 102 and this first configuration 105, a second configuration 104 is connected via connections 107 and 108. In the same way, a third configuration 103 is connected via connections 106 and 109 between communications link 101 and first configuration 105, a very flexible input and output of data as part of messages, particularly FlexRay messages into and out of first configuration 105 thereby being attainable at optimal speed, while ensuring the data integrity.

Figure 2:
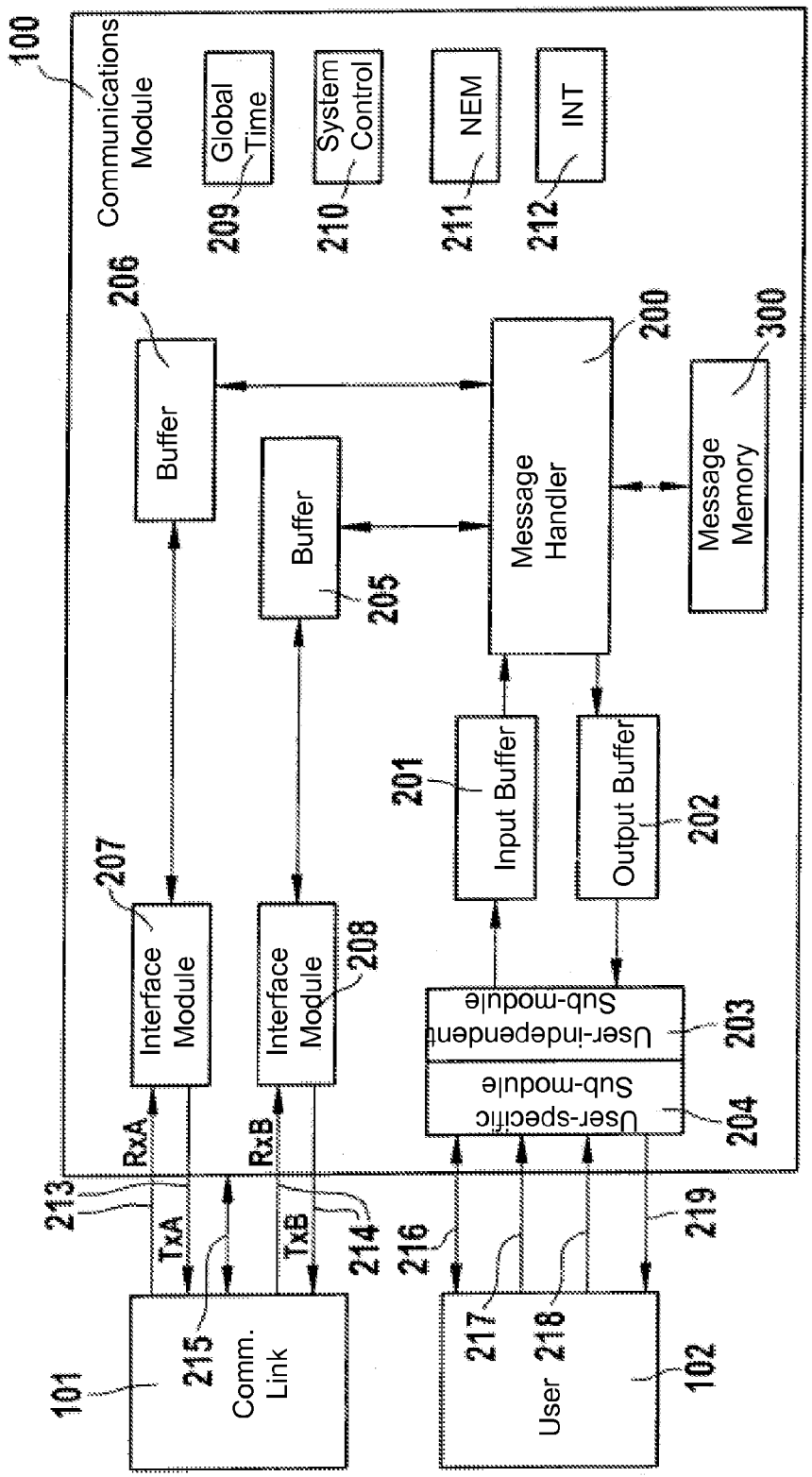
FIG. 2 shows in detail the communications module from FIG. 1, as well as its connection in a special specific embodiment.

In FIG. 2, this communications module 100 is shown again in greater detail in a preferred embodiment. Respective connections 106 through 109 are shown in detail, as well. In this case, second configuration 104 includes an input buffer (IBF) 201, an output buffer (OBF) 202, as well as an interface module made up of two parts 203 and 204, the one sub-module 203 being user-independent, and second sub-module 204 being user-specific. User-specific sub-module 204 (customer CPU interface CIF) connects a user-specific host CPU 102, thus a customer-specific user, to the FlexRay communications module. To that end, a bidirectional data line 216, an address line 217 and a control input 218 are provided. An interrupt output designated by 219 is likewise provided. User-specific sub-module 204 is connected to a user-independent sub-module 203 (generic CPU interface, GIF); that is, the FlexRay communications module or the FlexRay IP module has a generic, thus general CPU interface, to which a large number of different customer-specific host CPUs can be connected via corresponding user-specific sub-modules, thus customer CPU interfaces CIF. In this manner, only sub-module 204 must be varied as a function of the user, which means a markedly lower expenditure.

Input buffer 201 and output buffer 202 may be formed in one memory module or else in separate memory modules. Input buffer 201 is used for the buffer storage of messages for transmission to message memory 200. The input buffer is preferably designed in such a way that it is able to store two complete messages, each made up of a header segment, in particular having configuration data, and a data segment or payload segment. The input buffer is in two parts (partial buffer and shadow memory), which means that transmission between user CPU 102 and message memory 200 can be accelerated by writing the two parts of the input buffer by turns, i.e., by access alternation. In the same way, the output buffer (OBF) is used for the buffering of messages for transmission from message memory 200 to user CPU 102. Output buffer 202 is also configured in such a way that two complete messages made up of header segment, particularly having configuration data, and data segment, thus payload segment, are able to be stored. Here, as well, output buffer 202 is subdivided into two parts, a partial buffer and a shadow memory, which means transmission between user or host CPU 102 and message memory 200 may also be accelerated here by reading the two parts alternately, i.e., by access alternation. This second configuration 104, made up of blocks 201 through 204, is connected to first configuration 105, as shown.

Configuration 105 is made up of a message handler (MHD) 200 and a message memory 300 (message RAM). The message handler checks or controls the data transfer between input buffer 201 as well as output buffer 202, and message memory 300. In like manner, it checks or controls the data transmission in the other direction via third configuration 103. The message memory is preferably implemented as a single-ported RAM. This RAM memory stores the messages or message objects, thus the actual data, together with configuration data and status data. The exact structure of message memory 300 is shown in greater detail in FIG. 3.

Third configuration 103 is made up of blocks 205 through 208. Corresponding to the two channels of the FlexRay physical layer, this configuration 103 is divided into two data paths, each having two data directions. This becomes clear through connections 213 and 214, wherein the two data directions are shown for channel A, RxA for reception and TxA for transmission, as well as for channel B, RxB and TxB. An optional bidirectional control input is denoted by connection 215. Third configuration 103 is connected via a first buffer 205 for channel B and a second buffer 206 for channel A. These two buffers (transient buffer RAMs: RAM A and RAM B) are used as buffer storage for the data transmission from or to first configuration 105. Corresponding to the two channels, these two buffers 205 and 206 are connected to an interface module 207 and 208, respectively, which contain the FlexRay protocol controller or bus protocol controller made up of a transmit/receive shift register and the FlexRay protocol finite state machine. Therefore, the two buffers 205 and 206 are used as buffer storage for the data transmission between the shift registers of the interface modules or FlexRay protocol controller 207 and 208 and message memory 300. The data fields, thus the payload segment or data segment of two FlexRay messages, are advantageously stored by each buffer 205 or 206 here, as well.

Also shown in communications module 100 is the global time unit (GTU), designated by 209, which is responsible for the representation of the global time-slot pattern in the FlexRay, thus the microtick μT and the macrotick MT. The fault-tolerant clock synchronization of the cycle counter and the control of the time sequences in the static and dynamic segment of the FlexRay are regulated via global time unit 209, as well.

Block 210 represents the general system control (system universal control SUC) by which the operation modes of the FlexRay communication controller are checked and controlled. They include the wake-up, the startup, the reintegration or integration, normal operation and passive operation.

Block 211 shows the network and error management NEM as described in the FlexRay protocol specification v2.0. Finally, block 212 shows the interrupt control (INT) which manages the status and error interrupt flags and checks or controls interrupt output 219 to user CPU 102. In addition, block 212 contains an absolute and a relative timer for generating the time interrupts or timer interrupts.

Message objects or messages (message buffer) can be configured with up to 254 data bytes for the communication in a FlexRay network. In particular, message memory 300 is a message RAM which, for example, is able to store up to a maximum of 64 message objects. All functions which relate to the handling or management of the messages themselves are implemented in message handler 200. They are, for example, the acceptance filtering, transfer of messages between the two FlexRay protocol controller blocks 207 and 208 and message memory 300, thus the message RAM, as well as the control of the transmit sequence and the providing of configuration data and status data, respectively.

An external CPU, thus an external processor, user processor 102, is able to directly access the register of the FlexRay communications module via the user interface, using user-specific part 204. In this context, a plurality of registers is used. These registers are employed to configure and control the FlexRay protocol controller, thus interface modules 207 and 208, message handler (MHD) 200, global time unit (GTU) 209, system universal controller (SUC) 210, network and error management unit (NEM) 211, interrupt controller (INT) 212, as well as the access to the message RAM, thus message memory 300, and to indicate the corresponding status, as well. At least parts of these registers are discussed in greater detail in FIGS. 4 through 6 and 7 through 9. Such a described FlexRay communications module according to the present invention permits easy implementation of the FlexRay specification v2.0, whereby an ASIC or a microcontroller having corresponding FlexRay functionality may easily be generated.

Figure 3:
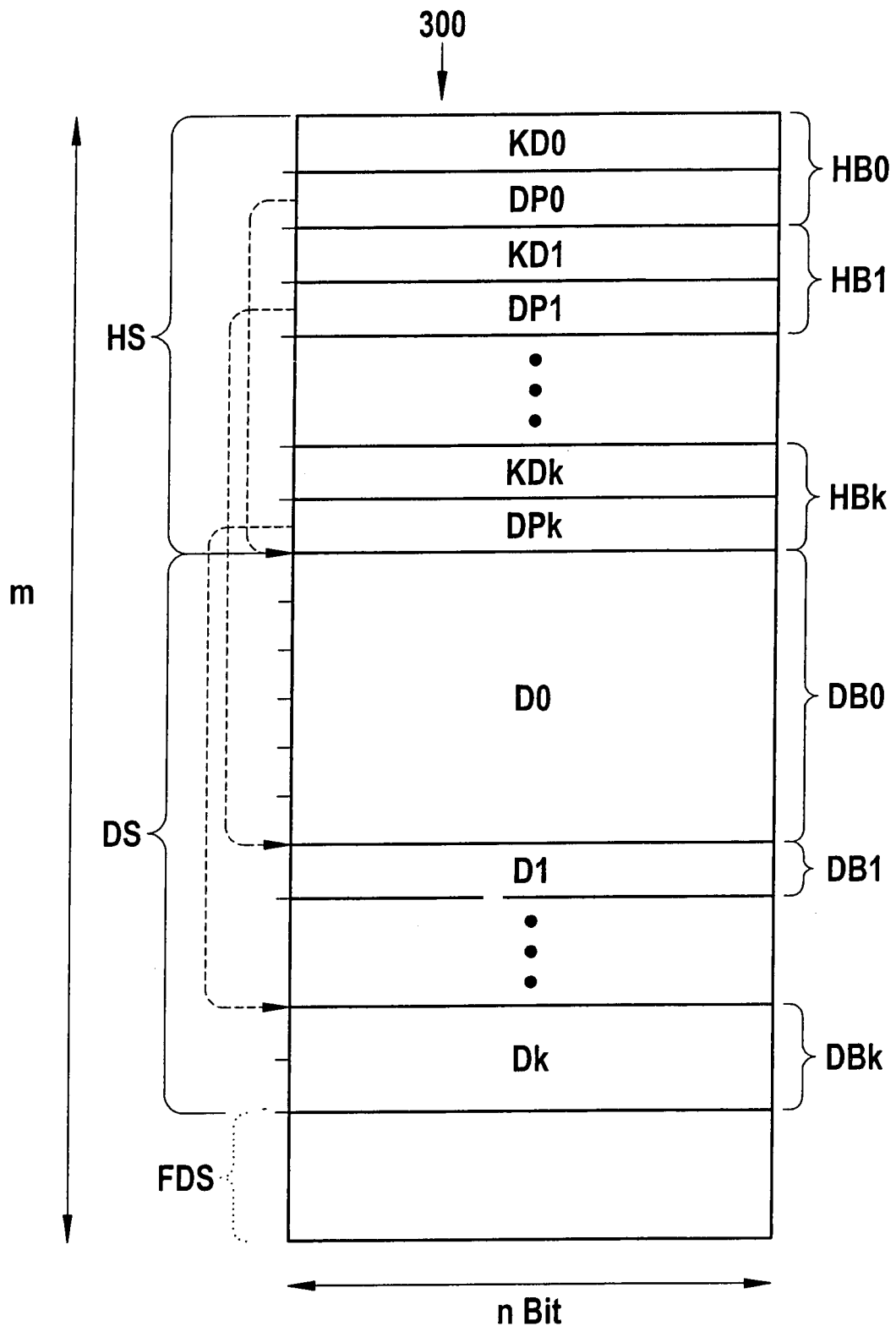
FIG. 3 shows the structure of the message memory.

FIG. 3 shows the partitioning of message memory 300 in detail. For the functionality of a FlexRay communication controller required according to the FlexRay protocol specification, a message memory is needed for making available messages to be transmitted (transmit buffer), as well as for storing messages received without error (receive buffer). A FlexRay protocol allows messages having a data area, thus a payload area, of 0 to 254 bytes. As shown in FIG. 2, the message memory is part of FlexRay communications module 100. The method described in the following, as well as the corresponding message memory illustrate the storage of messages to be transmitted and of received messages, particularly using a random access memory (RAM), the example mechanism of the present invention making it possible to store a variable number of messages in a message memory of predefined size. The number of messages able to be stored is a function of the size of the data areas of the individual messages, which means first of all, it is possible to minimize the size of the memory needed without limiting the size of the data areas of the messages, and secondly, the memory is optimally utilized. This variable partitioning of, in particular, a RAM-based message memory for a FlexRay communication controller shall now be described in greater detail below.

For the implementation, by way of example, a message memory having a stipulated word length of n bits, e.g., 8, 16, 32, etc., as well as a predefined memory depth of m words is now specified (m, n as natural numbers). In this instance, message memory 300 is partitioned into two segments, a header segment HS and a data segment DS (payload segment). Thus, one header area HB and one data area DB are created per message. Therefore, for messages 0, 1 through k (k as natural number), header areas HB0, HB1 through HBk and data areas DB0, DB1 through DBk are created. Thus, in a message, there is a distinction between first and second data, the first data corresponding to configuration data and/or status data with respect to the FlexRay message, and in each case being put in a header area HB (HB0, HB1, . . . , HBk). The second data, which correspond to the actual data to be transmitted, are put accordingly in data areas DB (DB0, DB1, . . . , DBk). Thus, a first scope of data (measured in bits, bytes or memory words) is obtained for the first data per message, and a second scope of data (likewise measured in bits, bytes or memory words) is obtained for the second data of a message; the second scope of data may be different per message. The partition between header segment HS and data segment DS is now variable in message memory 300, i.e., no predefined boundary exists between the areas. According to the example embodiment of the present invention, the partition between header segment HS and data segment DS is a function of the number k of messages, as well as of the second scope of data, thus the scope of the actual data, of one message or of all k messages together. In the example embodiment, a pointer element or data pointer DP0, DP1 through DPk is now in each case assigned directly to configuration data KD0, KD1 through KDk of the respective message. In the special embodiment, a fixed number of memory words, here two, is assigned to each header area HB0, HB1 through HBk, so that one configuration datum KD (KD0, KD1, . . . , KDk) and one pointer element DP (DP0, DP1, . . . , DPk) are always filed together in one header area HB. Following this header segment HS having header areas HB, whose size or first scope of data is a function of the number k of messages to be stored, is data segment DS for storing actual message data D0, D1 through Dk. This data segment (or data section) DS is dependent in its scope of data on the respective scope of data of the message data filed, here, for example, six words in DB0, one word in DB1 and two words in DBk. Therefore, respective pointer elements DP0, DP1 through DPk always point to the beginning, thus at the start address of the respective data area DB0, DB1 through DBk in which data D0, D1 through Dk of respective messages 0, 1 through k are filed. Consequently, the partitioning of the message memory between header segment HS and data segment DS is variable and is a function of the number of messages themselves as well as the specific scope of data of one message, and therefore the entire second scope of data. If fewer messages are configured, the header segment becomes smaller and the area becoming free in the message memory may be used as supplement to data segment DS for the storage of data. This variability ensures optimal storage utilization, thereby also permitting the use of smaller memories. Free data segment FDS, particularly its size, likewise a function of the combination of the number k of stored messages and the specific second scope of data of the messages, is therefore minimal and may even become 0.

In addition to the use of pointer elements, it is also possible to store the first and second data, thus configuration data KD (KD0, KD1, . . . , KDk) and actual data D (D0, D1, . . . , Dk) in a specifiable sequence, so that the sequence of header areas HB0 through HBk in header segment HS and the sequence of data areas DB0 through DBk in data segment DS are in each case identical. It could then even be possible to dispense with a pointer element.

In one special refinement, the message memory is assigned an error-identifier generator, particularly a parity bit generator element, and an error-identifier checker, particularly a parity bit check element, to ensure the correctness of the stored data in HS and DS, in that one checksum may be co-stored, especially as a parity bit, per memory word or per area (HB and/or DB). Other check identifiers, e.g., a CRC (cyclic redundancy check) or even identifiers of greater powerfulness such as ECC (error code correction) are possible. Consequently, the following advantages result compared to a fixed partitioning of the message memory:

In the programming, the user is able to decide whether he/she would like to use a larger number of messages with a small data field or a smaller number of messages with a large data field. In the configuration of messages having a data area of variable size, the available memory space is optimally utilized. The user has the possibility of utilizing one data-memory area jointly for different messages.

In the implementation of the communication controller on an integrated circuit, it is possible to adjust the size of the message memory by adapting the memory depth of the memory used to the requirements of the application, without altering the other functions of the communication controller.

In the following, the host CPU access, thus writing and reading of configuration data and status data, respectively, and the actual data via buffer configuration 201 and 202 is now described in greater detail with reference to FIGS. 4 through 6 and 7 through 9. In so doing, the goal is to produce a decoupling with respect to the data transmission, such that the data integrity may be guaranteed, and at the same time a high transmission rate is ensured. These operations are controlled via message handler 200, which is described later in greater detail in FIGS. 10, 11 and 12.

Figure 4:
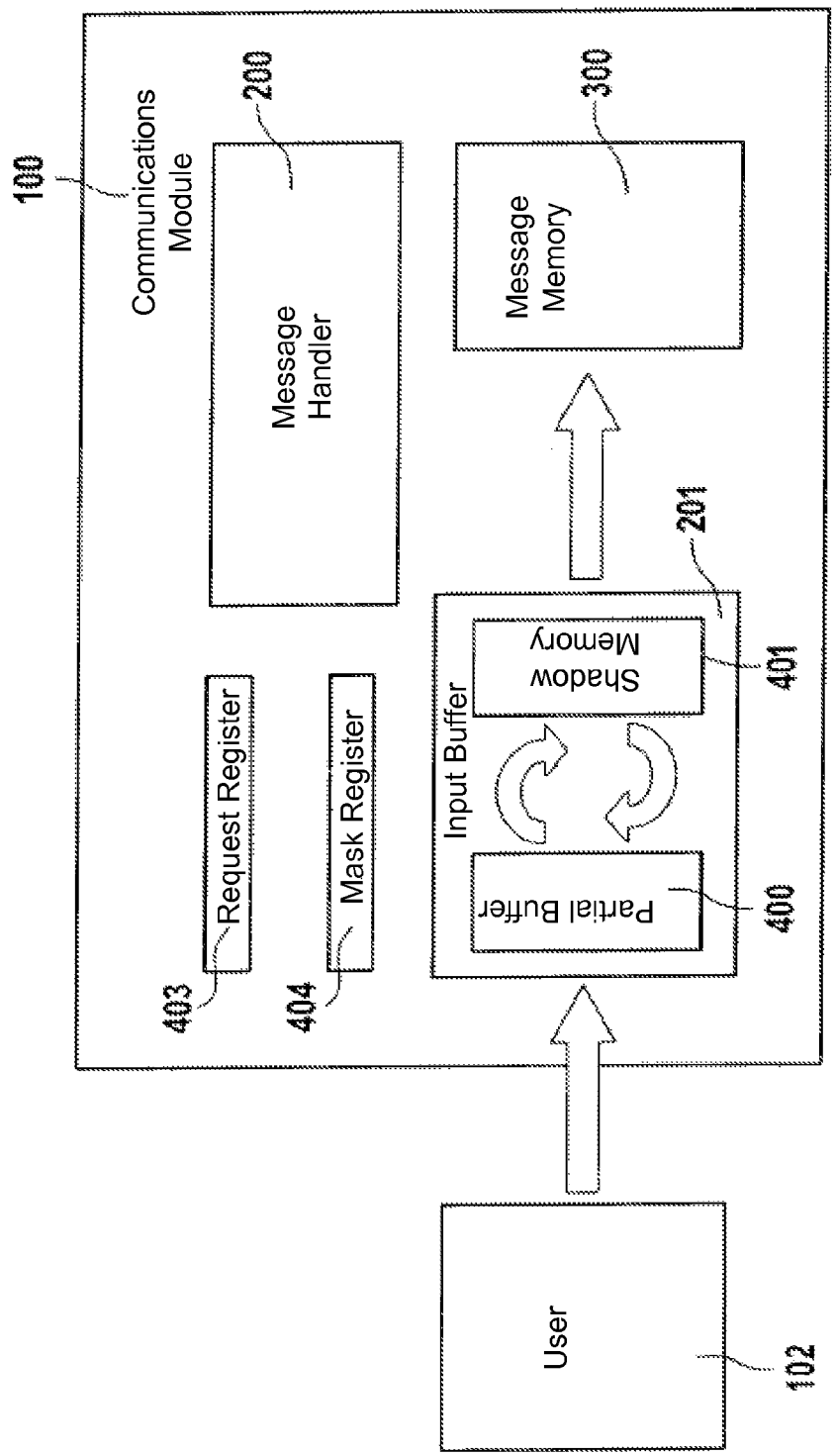
FIGS. 4 through 6 schematically illustrate the architecture and process of the data access in the direction from the user to the message memory.
Figure 5:
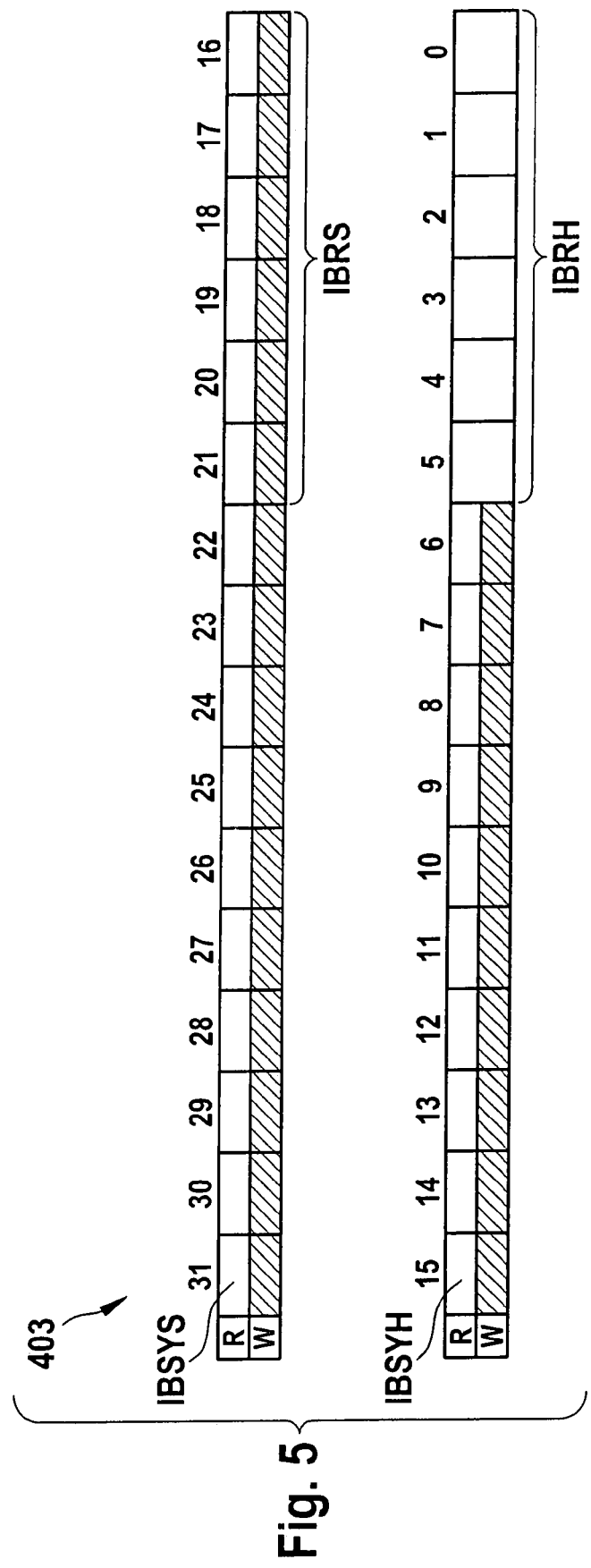
Figure 6:
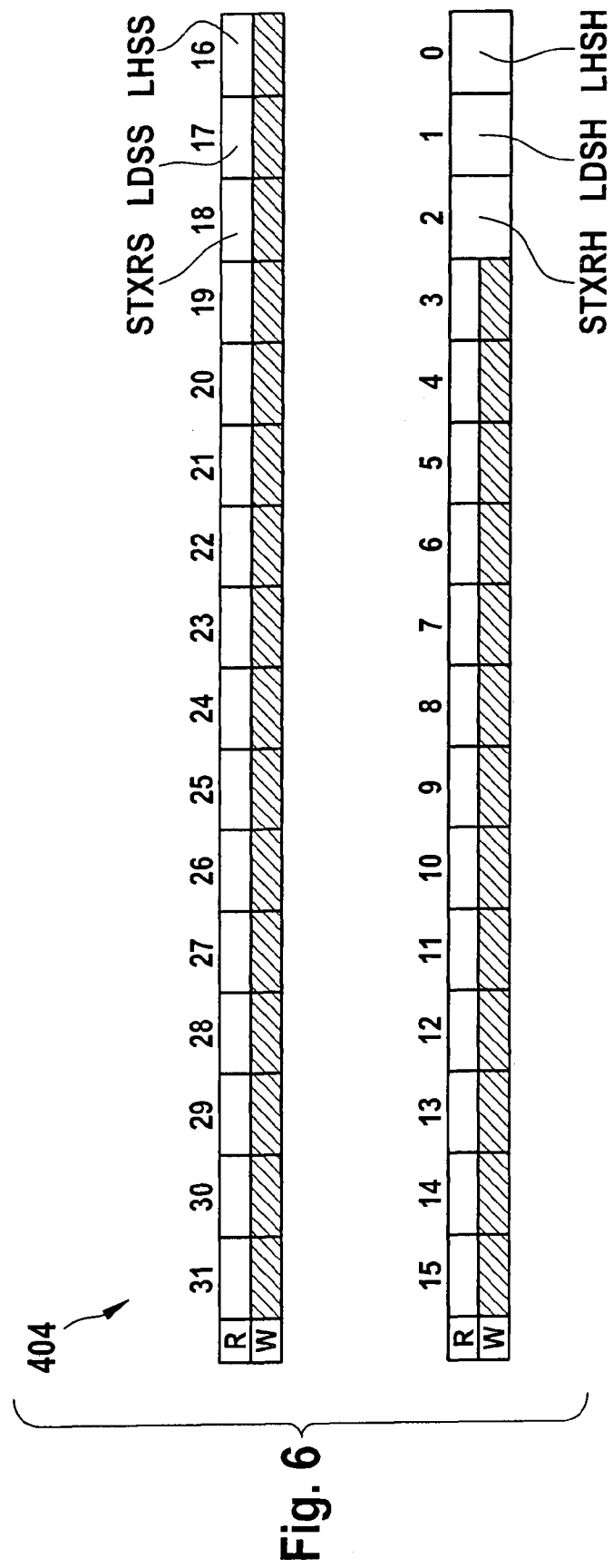

The write accesses to message memory 300 by the host CPU, user CPU 102, via input buffer 201 is first explained in greater detail in FIGS. 4, 5 and 6. For that purpose, FIG. 4 again shows communications module 100, only the parts of communications module 100 relevant here being shown for reasons of clarity. Message handler 200 responsible for controlling the operational sequences, as well as two control registers 403 and 404 which, as shown, may be accommodated outside of message handler 200 in communications module 100, but may also be contained in message handler 200 itself. 403 represents the input buffer command request register, and 404 represents the input buffer command mask register. Thus, write accesses by host CPU 102 to message memory 300 (message RAM) take place via an interposed input buffer 201. This input buffer 201 is now designed in a divided or duplicated manner, and specifically as partial buffer 400 and a shadow memory 401 belonging to the partial buffer. Consequently, as described below, a continuous access of host CPU 102 to the messages or message objects, or rather data of message memory 300 is able to be accomplished, and with that, data integrity and accelerated transmission are ensured. The accesses are controlled via input buffer command request register 403, and via input buffer command mask register 404. In register 403, the numbers from 0 through 31 represent the respective bit positions in 403, here, by way of example, for a width of 32 bits. The same holds true for register 404, and bit positions 0 through 31 in 404.

As an example, according to the present invention, bit positions 0 through 5, 15, 16 through 21 and 31 of register 403 are given a special function with respect to the sequence control. Thus, an identifier IBRH (input buffer request host) is able to be entered as message identifier into bit positions 0 through 5 of register 403. In the same way, an identifier IBRS (input buffer request shadow) is able to be entered into bit positions 16 through 21 of register 403. IBSYH is entered into register position 15 of 403, and IBSYS is entered into register position 31 of 403 as access identifiers, as well. Positions 0 through 2 of register 404 are also marked, further identifiers being entered as data identifiers in 0 and 1 with LHSH (load header section host) and LDSH (load data section host). These data identifiers are in the simplest form here, namely, each takes the form of one bit. In bit position 2 of register 404, a start identifier is written in with STXRH (set transmission X request host).

In the following, the sequence of the write access to the message memory via the input buffer is now described.

Host CPU 102 writes into input buffer 201, the data of the message to be transferred. In so doing, host CPU 102 is able to write only the configuration and header data KD of a message for header segment HS of the message memory, or only the actual data D of a message that are to be transmitted for data segment DS of the message memory, or both. Which part of a message, thus, configuration data and/or the actual data, is to be transmitted is established by special data identifiers LHSH and LDSH in input buffer command mask register 404. In this context, LHSH (load header section host) establishes whether the header data, thus configuration data KD, are to be transmitted, and LDSH (load data section host) establishes whether data D are to be transmitted. Because input buffer 201 is designed in two parts having a partial buffer 400 and an associated shadow memory 401, and a two-way alternate access is intended to take place, two further data-identifier areas, which are now related to shadow memory 401, are provided as counterpart to LHSH and LDSH. These data identifiers in bit positions 16 and 17 of register 404 are denoted by LHSS (load header section shadow) and LDSS (load data section shadow). They therefore control the transmission process with respect to shadow memory 401.

If the start bit or start identifier STXRH (set transmission X request host) is now set in bit position 2 of input buffer command mask register 404, then after the configuration data and/or actual data to be transmitted in each case have been transferred into message memory 300, a transmission request is automatically set for the corresponding message object.

That is to say, the automatic sending of a transmitted message object is controlled, in particular started, by this start identifier STXRH.

Correspondingly, the counterpart to this for the shadow memory is start identifier STXRS (set transmission X request shadow) which, for example, is contained in bit position 18 of input buffer command mask register 404, and here in the simplest case is likewise in the form of one bit. The function of STXRS is analogous to the function of STXRH, merely specific to shadow memory 401.

When host CPU 102 writes the message identifier, especially the number of the message object in message memory 300 into which the data of input buffer 201 are to be transferred, into bit positions 0 through 5 of input buffer command request register 403, thus according to IBRH, partial buffer 400 of input buffer 201 and associated shadow memory 401 are exchanged, i.e., the respective access of host CPU 102 and message memory 300 to the two partial memories 400 and 401 is exchanged, as indicated by the semicircular arrows. In so doing, for example, the data transfer, thus the data transmission to message memory 300 is started, as well. The data transmission to message memory 300 itself is accomplished from shadow memory 401. At the same time, register areas IBRH and IBRS are exchanged. LHSH and LDSH are exchanged for LHSS and LDSS, as well. Likewise, STXRH is exchanged with STXRS. Therefore, IBRS shows the identifier of the message, thus the number of the message object for which a transmission, thus a transfer from shadow memory 401 is in operation, i.e., which message object, thus which area in the message memory as last has received data (KD and/or D) from shadow memory 401. By the identifier (here again, for example, 1 bit) IBSYS (input buffer busy shadow) in bit position 31 of input buffer command request register 403, it is indicated whether a transmission with involvement of shadow memory 401 is taking place at the moment. Thus, for example, in the case of IBSYS=1, transmission is taking place from shadow memory 401 at the moment, and in the case of IBSYS=0, is not. For example, this bit IBSYS is set by the writing of IBRH, thus bit positions 0 through 5 in register 403 in order to indicate that a transfer between shadow memory 401 and message memory 300 is in operation. After this data transmission to message memory 300 has ended, IBSYS is reset again.

While the data transfer from shadow memory 401 is just in operation, host CPU 102 is able to write the next message to be transferred into the input buffer, i.e., into partial buffer 400. With the aid of a further access identifier IBSYH (input buffer busy host), e.g., in bit position 15 of register 403, the identifier may be even further refined. If host CPU 102 writes precisely IBRH, thus bit positions 0 through 5 of register 403 while a transmission between shadow memory 401 and message memory 300 is in progress, thus IBSYS=1, then IBSYH is set in input buffer command request register 403. As soon as the current transfer, thus the current transmission is concluded, the requested transfer (request through STXRH, see above) is started, and bit IBSYH is reset. Bit IBSYS remains set during the entire time to indicate that data are being transferred to the message memory. All bits used in all the exemplary embodiments may also be in the form of identifiers having more than one bit. A one-bit solution is advantageous for economic reasons from the standpoint of memory and processing.

The mechanism thus described allows host CPU 102 to continually transfer data into the message objects located in the message memory and made up of header area HB and data area DB, assuming the access speed of host CPU 102 to the input buffer is less than or equal to the internal data-transfer rate of the FlexRay IP module, thus of communications module 100.

Figure 7:
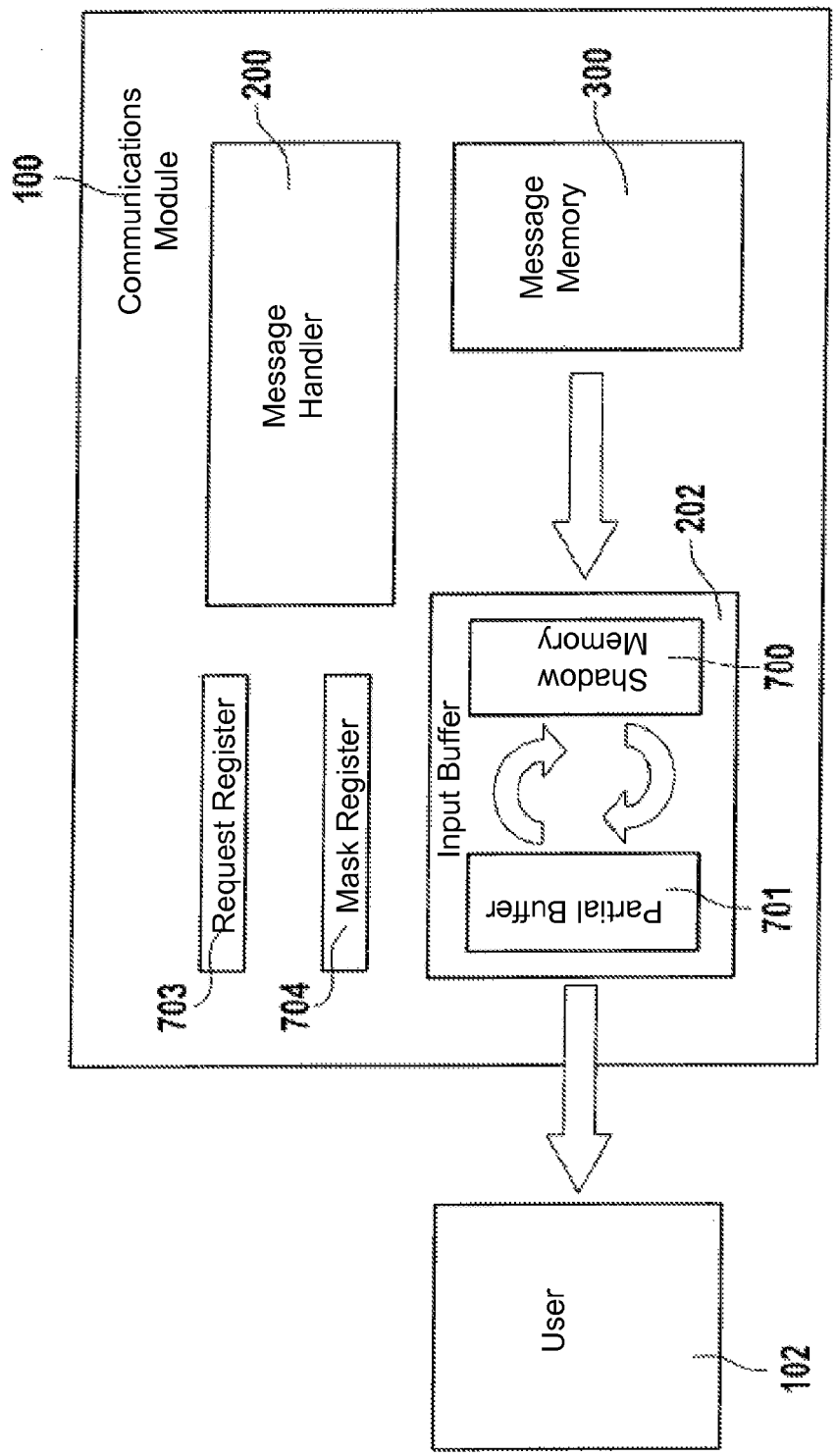
FIGS. 7 through 9 schematically illustrate the architecture and process of the data access in the direction from the message memory to the user.
Figure 8:
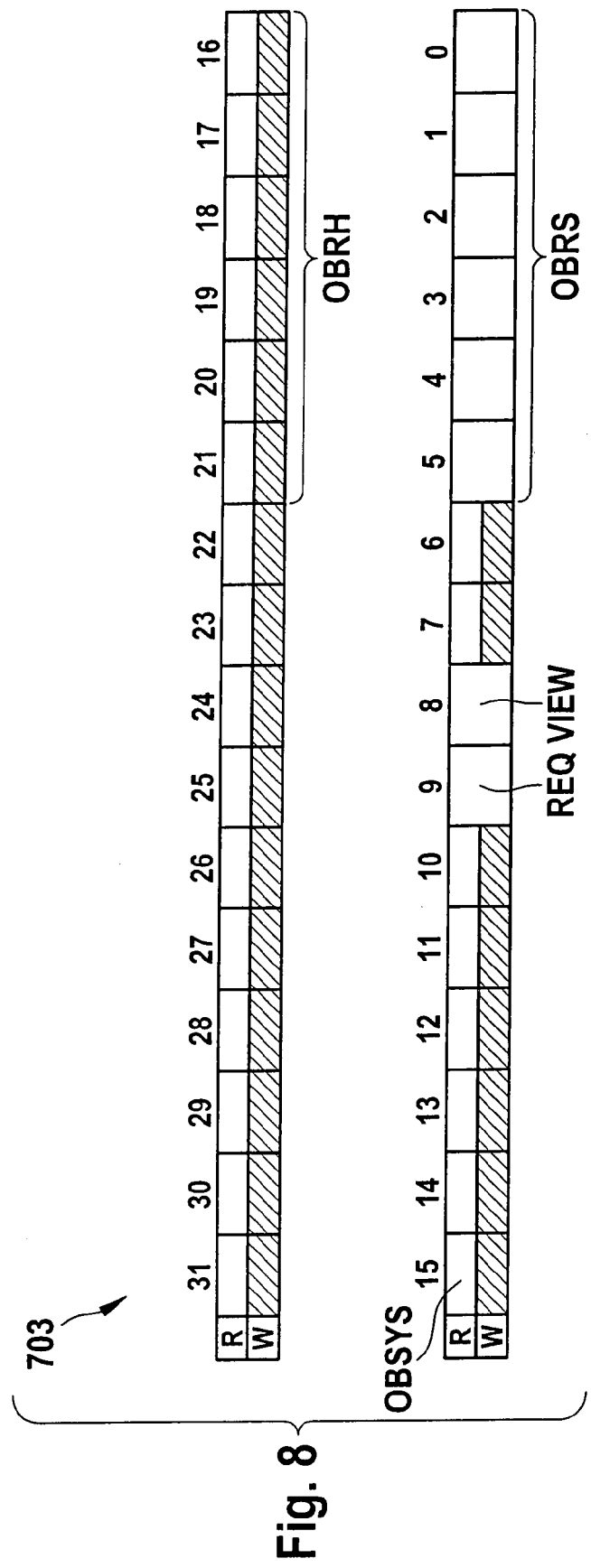
Figure 9:
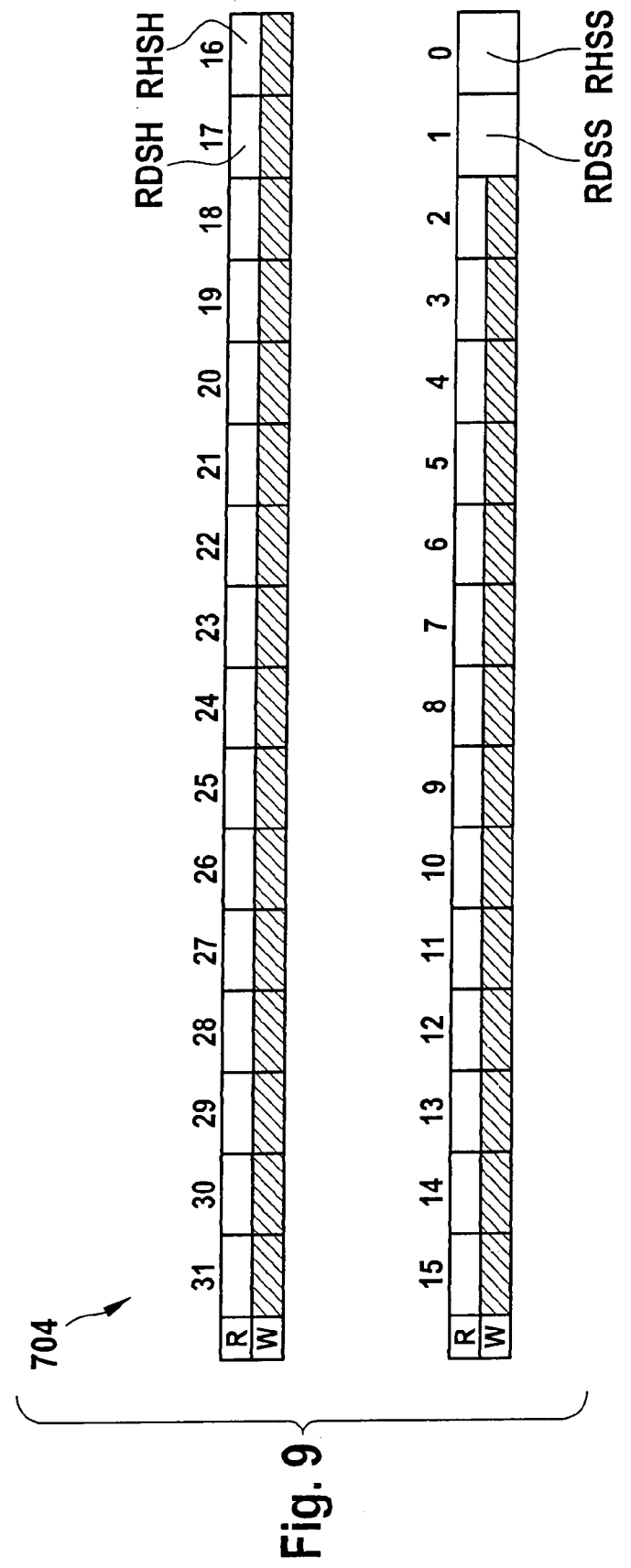

The read accesses to message memory 300 by host CPU or user CPU 102 via output buffer 202 are now elucidated in FIGS. 7, 8 and 9. For that purpose, FIG. 7 again shows communications module 100, for reasons of clarity, only the relevant parts of communications module 100 being shown here, as well. They are, first of all, message handler 200 responsible for controlling the operational sequences, as well as two control registers 703 and 704 which, as shown, may be accommodated outside of message handler 200 in communications module 100, but may also be contained in message handler 200 itself. 703 represents the output buffer command request register, and 704 represents the output buffer command mask register. Thus, read accesses by host CPU 102 to message memory 300 take place via interposed output buffer 202. This output buffer 202 is now likewise designed in a divided or duplicated manner, and specifically as partial buffer 701 and a shadow memory 700 belonging to the partial buffer. Consequently, as described below, a continuous access by host CPU 102 to the messages or message objects, or rather data of message memory 300 is able to be accomplished here, as well, and with that, data integrity and accelerated transmission are now ensured in the reverse direction from the message memory to the host. The accesses are controlled via output buffer command request register 703, and via output buffer command mask register 704. In register 703, as well, the numbers from 0 through 31 represent the respective bit positions in 703, here, by way of example, for a width of 32 bits. The same holds true for register 704 and bit positions 0 through 31 in 704.

As example, according to an example embodiment the present invention, bit positions 0 through 5, 8 and 9, 15 and 16 through 21 of register 703 are now given a special function with respect to the sequence control of the read access. Thus, an identifier OBRS (output buffer request shadow) is able to be entered as message identifier into bit positions 0 through 5 of register 703. In the same way, an identifier OBRH (output buffer request host) is able to be entered into bit positions 16 through 21 of register 703. An identifier OBSYS (output buffer busy shadow) is able to be entered as access identifier into bit position 15 of register 703. Positions 0 and 1 of output buffer command mask register 704 are also marked, further identifiers being entered as data identifiers into bit positions 0 and 1 with RDSS (read data section shadow) and RHSS (read header section shadow). Additional data identifiers are provided, for example, in bit positions 16 and 17 with RDSH (read data section host) and RHSH (read header section host). These data identifiers are also in the simplest form here by way of example, namely, each takes the form of one bit. A start identifier REQ is entered into bit position 9 of register 703. A switchover identifier VIEW is also provided, which is entered by way of example in bit position 8 of register 703.

Host CPU 102 requests the data of a message object from message memory 300 by writing the identifier of the desired message, thus, in particular, the number of the desired message object, according to OBRS, thus into bit positions 0 through 5 of register 703. As in the reverse direction, in this case the host CPU may also either read only the status or configuration data and header data KD of a message, thus from a header area, or may only read data D of a message that are actually to be transmitted, thus from the data area, or also both. Which part of the data, thus from the header area and/or data area is to be transmitted is established in a manner comparable to the reverse direction by RHSS and RDSS. That is to say, RHSS indicates whether the header data are to be read, and RDSS indicates whether the actual data are to be read.

A start identifier is used to start the transmission from the message memory to shadow memory 700. That is, if, as in the simplest case, one bit is used as identifier, the transmission from message memory 300 to shadow memory 700 is started by setting bit REQ in bit position 9 in output buffer command request register 703. The active transmission is again indicated by an access identifier, here again in the simplest case by one bit OBSYS in register 703. To avoid collisions, it is advantageous if bit REQ can only be set when OBSYS is not set, thus no active transmission is taking place at the moment. The message transfer between message memory 300 and shadow memory 700 then also takes place here. The actual operational sequence could now on one hand be controlled in a manner comparable to the reverse direction as described under FIGS. 4, 5 and 6 (complementary register occupancy) and carried out, or else, in a variation, be controlled by an additional identifier, namely, a switchover identifier VIEW in bit position 8 of register 703. That is, after the transmission is completed, bit OBSYS is reset, and partial buffer 701 and associated shadow memory 700 are exchanged, i.e., the accesses to them are exchanged, by setting bit VIEW in output buffer command request register 703, and host CPU 102 is now able to read out the message object requested from the message memory, thus the corresponding message, from partial buffer 701. In this context, comparable to the reverse transmission direction in FIGS. 4 through 6, register cells OBRS and OBRH are exchanged here, as well. RHSS and RDSS are likewise exchanged for RHSH and RDSH. As a protective mechanism, it is also possible to provide here that bit VIEW can only be set when OBSYS is not set, thus no active transmission is taking place.

Therefore, read accesses by host CPU 102 to message memory 300 take place via an interposed output buffer 202. Just like the input buffer, this output buffer has a duplicate or two-part design to ensure a continuous access of host CPU 102 to the message objects which are stored in message memory 300. The advantages of high data integrity and accelerated transmission are achieved here, as well.

The use of the input and output buffers described ensures that a host CPU is able to access the message memory without interruption in spite of the module-internal latency times.

Figure 10:
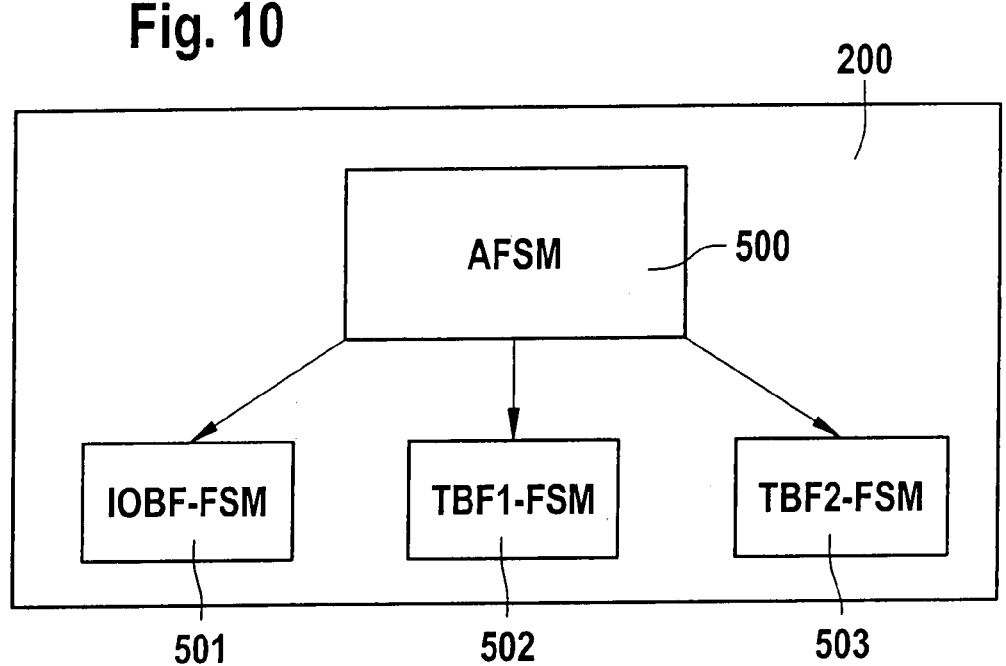
FIG. 10 schematically illustrates the message handler and the finite state machines contained therein.

To guarantee this data integrity, the data transmission, especially the forwarding in communications module 100, is undertaken by message handler (MHD) 200. To that end, message handler 200 is shown in FIG. 10. The message handler is displayable in its functionality by a plurality of state machines or state automatons, thus finite automatons referred to as finite state machines (FSM). In this instance, at least three state machines are provided, and in one special specific embodiment, four finite state machines are provided. A first finite state machine is the IOBF-FSM (input/output buffer state machine), designated by 501. This IOBF-FSM could also be subdivided into two finite state machines, one per transmission direction with respect to the input buffer or the output buffer, IBF-FSM (input buffer FSM) and OBF-FSM (output buffer FSM); a maximum of five state automatons (IBF-FSM, OBF-FSM, TBF1-FSM, TBF2-FSM, AFSM) would thereby be possible. However, preferably one joint IOBF-FSM is to be provided. In accordance with the preferred exemplary embodiment, an at least second finite state machine is subdivided here into two blocks 502 and 503 and operates the two channels A and B with respect to memories 205 and 206, as described regarding FIG. 2. In this context, one finite state machine may be provided to operate both channels A and B, or else, as in the preferred form, one finite state machine TBF1-FSM designated by 502 (transient buffer 1 (206, RAM A) state machine) for channel A, and one TBF2-FSM designated by 503 (transient buffer 2 (205, RAM B) state machine) for channel B.

In the preferred exemplary embodiment, an arbiter finite state machine, referred to as AFSM and denoted by 500, is used to control the access of the three finite state machines 501-503. The data (KD and/or D) are transmitted in a clock pulse, generated by a clock-pulse means such as a VCO (voltage controlled oscillator), a quartz-crystal oscillator, etc., or adapted from it, in the communications module. In this context, clock pulse T may be generated in the module or predefined from outside, e.g., as bus timing. This arbiter finite state machine AFSM 500 gives access to the message memory in turns to one of the three finite state machines 501-503, particularly in each instance for one clock-pulse period T. That is, the time available is distributed in accordance with the access requests by individual state automatons 501, 502, 503, to these requesting state automatons. If only one finite state machine requests access, then it receives 100% of the access time, thus all clock pulses T. If two state automatons request access, then each finite state machine receives 50% of the access time. Finally, if three state automatons request access, then each of the finite state machines receives ⅓ of the access time. The bandwidth available in each case is thereby optimally utilized.

The first finite state machine designated by 501, thus IOBF-FSM, carries out the following actions as needed:
Data transfer from input buffer 201 to the selected message object in message memory 300.
Data transfer from the selected message object in message memory 300 to output buffer 202.
The state machine for channel A 502, thus TBF1-FSM, carries out the following actions:
Data transfer from the selected message object in message memory 300 to buffer 206 of channel A.
Data transfer from buffer 206 to the selected message object in message memory 300.
Search for the appropriate message object in the message memory; upon reception, the message object (receive buffer) is sought for storage of a message, received on channel A, within the framework of an acceptance filtering, and upon transmission, the next message object (transmit buffer) to be transmitted on channel A.
The action of TBF2-FSM, thus of the finite state machine for channel B in block 503, is analogous thereto. It carries out the data transfer from the selected message object in message memory 300 to buffer 205 of channel B, and the data transfer from buffer 205 to the selected message object in message memory 300. The search function for an appropriate message object in the message memory is also analogous to TBF1-FSM; upon reception, the message object (receive buffer) is sought for storage of a message, received on channel B, within the framework of an acceptance filtering, and upon transmission, the next message or message object (transmit buffer) to be transmitted on channel B.

Figure 11:
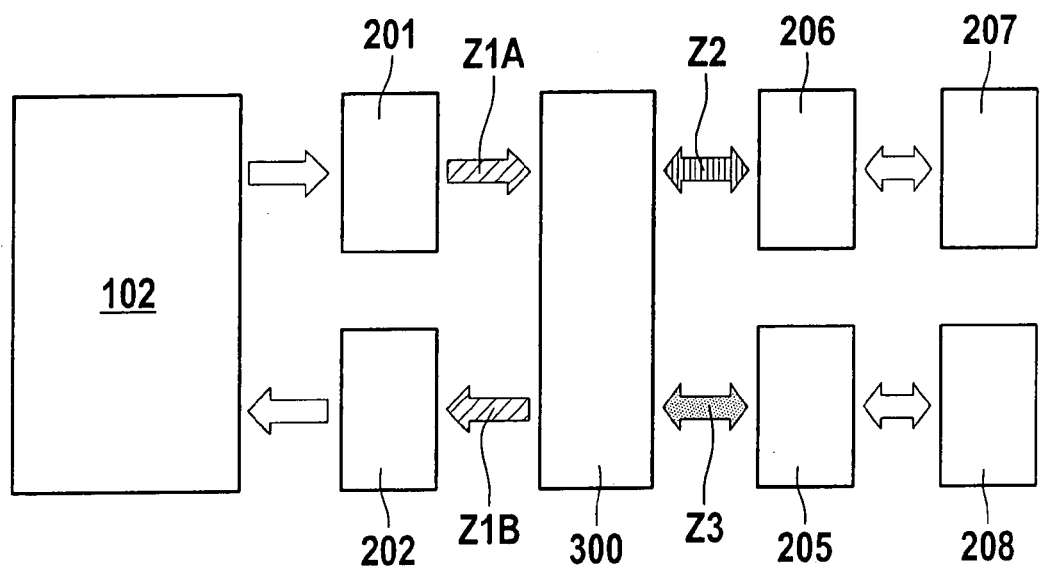
FIG. 11 again shows schematically the component parts of the communications module, as well as the user and the relevant data paths controlled by the message handler.

The operational sequences and the transmission paths are now shown again in FIG. 11. The three state machines 501-503 control the respective data transmissions between the individual parts. The host CPU is again represented by 102, the input buffer by 201, and the output buffer by 202. The message memory is represented by 300, and the two buffers for channel A and channel B are represented by 206 and 205. Interface elements 207 and 208 are likewise shown. First state automaton IOBF-FSM, designated by 501, controls data transfer Z1A and Z1B, thus from input buffer 201 to message memory 300 and from message memory 300 to output buffer 202. The data is transmitted via data buses with a word length of, e.g., 32 bits, any other bit number also being possible. The same holds true for transmission Z2 between the message memory and buffer 206. This data transmission is controlled by TBF1-FSM, thus 502, the state machine for channel A. Transmission Z3 between message memory 300 and buffer 205 is controlled by state automaton TBF2-FSM, thus 503. Here, as well, the data is transferred via data buses with a word length of, e.g., 32 bits, any other bit number likewise being possible here.

Normally, the transfer of a complete message object via the indicated transmission paths requires a plurality of clock-pulse periods T. Therefore, the transmission time is divided based on clock-pulse periods T by the arbiter, i.e., AFSM 500. Thus, FIG. 11 shows the data paths between the memory components controlled by the message handler. To ensure the data integrity of the message objects stored in the message memory, advantageously, data should be exchanged on only one of the paths shown, thus Z1A and Z1B as well as Z2 and Z3, at the same time.

Figure 12:
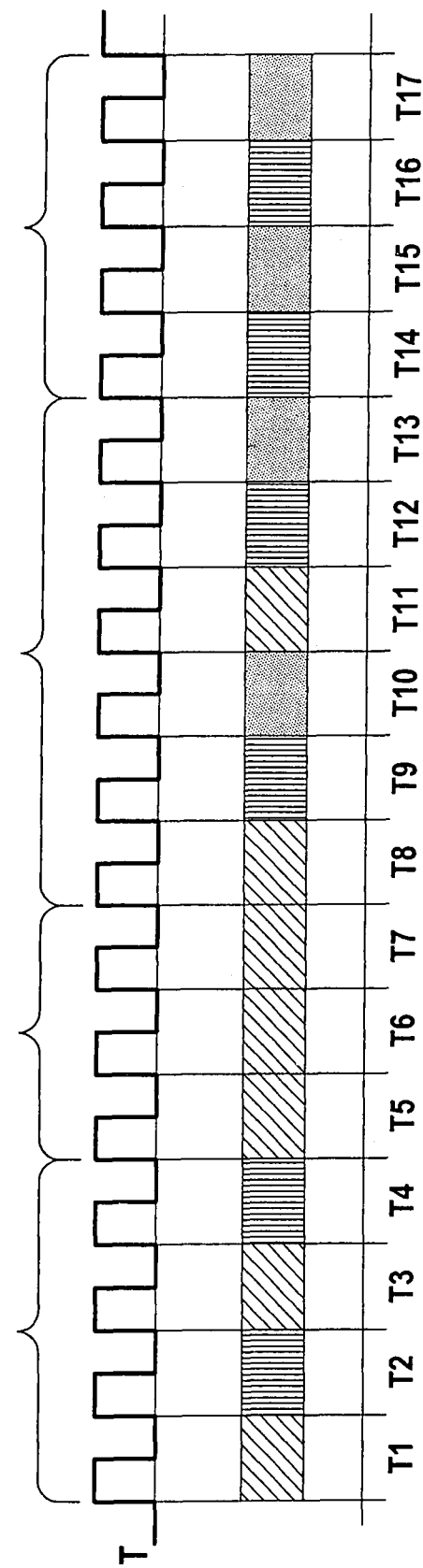
FIG. 12 describes the access distribution specific to the data paths in FIG. 11.

FIG. 12 shows, by way of example, how the available system clock pulses T are distributed by the arbiter, thus AFSM 500, to the three requesting state automatons. In phase 1, access requests are made by state automaton 501 and state automaton 502, i.e., that the entire time be distributed one half each to the two requesting state automatons. Specific to the clock-pulse periods in phase 1, this means that state automaton 501 receives access in clock-pulse periods T1 and T3, and state automaton 502 receives access in clock-pulse periods T2 and T4. In phase 2, access is made only by state machine 501, so that all three clock-pulse periods, thus 100% of the access time from T5 through T7 is allotted to IOBF-FSM. In phase 3, access requests are made by all three state automatons 501 through 503, so that the total access time is divided three ways. For example, arbiter AFSM then distributes the access time so that finite state machine 501 receives access in clock-pulse periods T8 and T11, finite state machine 502 receives access in clock-pulse periods T9 and T12, and finite state machine 503 receives access in clock-pulse periods T10 and T13. Finally, in phase 4, access is carried out by two state automatons 502 and 503 on the two channels A and B of the communications module, so that an access distribution of clock-pulse periods T14 and T16 to finite state machine 502 is implemented, and in T15 and T17 to finite state machine 503.

Thus, arbiter state automaton AFSM 500 ensures that, for the case when more than one of the three state machines makes a request for an access to message memory 300, the access is distributed with clock-pulse timing and in alternation to the requesting state machines. This procedure ensures the integrity of the message objects stored in the message memory, thus the data integrity. For example, if host CPU 102 wants to read out a message object via output buffer 202 while at the moment a received message is being written into this message object, then depending upon which request was started first, either the old state or the new state is read out, without the accesses in the message object in the message memory itself colliding.

The example method described permits the host CPU, during continuous operation, to read or to write any message object in the message memory without the selected message object being blocked from participation in the data exchange on both channels of the FlexRay bus for the duration of the access by the host CPU (buffer locking). At the same time, by the interleaving of the accesses with clock-pulse timing, the integrity of the data stored in the message memory is ensured, and the transmission rate is also increased by utilization of the full bandwidth.

What is claimed is:

1. A message handler of a communications module, comprising:
  a message memory, in which data is input or output in response to an access;
  a first buffer configuration arranged between the message memory and an interface to a communication link;
  a second buffer configuration arranged between the message memory and an interface to a user processor, the message memory being connected to the first buffer configuration and the second buffer configuration, and the data being accessed via the first or the second buffer configuration;
  at least one first finite state machine that controls the access to the message memory via the first buffer configuration;
  at least one second finite state machine that controls the access via the second buffer configuration, the at least one first finite state machine and the second finite state machine making access requests;
  a third finite state machine that assigns access to the message memory to the at least one first finite state machine and the second finite state machine as a function of their access requests; and
  an arrangement including:
    (a) processing circuitry adapted for controlling the second buffer configuration such that:
      in response to an access request in which a message object is to be transmitted between the message memory and the user processor, transmission of the message object to its target destination via the second buffer configuration is postponed until after the message object is fully loaded into the second buffer configuration; and
      while the transmission is postponed, further access requests between the message memory and the user processor along the same transmission direction are disabled; and
    (b) a first register storing a start identifier that indicates a start of transmission to the target destination, and a second register storing a message identifier that indicates whether a transmission is on-going.

2. The message handler as recited in claim 1, wherein the data are transmitted via the first buffer configuration in two data paths having in each case two data directions, and the first buffer configuration contains a first buffer for a first data path and a second buffer for a second data path, and a first finite state machine is provided per data path, each of the two first finite state machines controlling the access to the message memory via one buffer each.

3. The message handler as recited in claim 1, further comprising:
  a clock-pulse arrangement by which the data are transmitted in a specifiable clock-pulse period, and the third finite state machine assigns clock-pulse periods in succession to each first finite state machine and the second finite state machine as a function of their access requests.

4. The message handler as recited in claim 1, wherein depending on a number of simultaneous access requests, a total access time is distributed uniformly by the third finite state machine according to the number, only one access request ever being permissible simultaneously per finite state machine.

5. The message handler as recited in claim 1, wherein the message handler is arranged in a communications module.

6. A method for controlling access to data of a message memory of a communications module using a message handler, comprising:

inputting or outputting data into or out of the message memory in response to an access, the message memory being connected to a first buffer configuration and a second buffer configuration, the first buffer configuration arranged between the message memory and an interface to a communication link, the second buffer configuration arranged between the message memory and an interface to a user processor, and the data being accessed via the first or the second buffer configuration;

providing at least one first finite state machine that controls the access to the message memory via the first buffer configuration as a first access path;

providing a second finite state machine that controls the access via the second buffer configuration as a second access path, the data being accessed on only one of the access paths at the same time;

in response to an access request in which a message object is to be transmitted between the message memory and the user processor, postponing transmission of the message object to its target destination via the second buffer configuration until after the message object is fully loaded into the second buffer configuration;

while the transmission is postponed, disabling further access requests between the message memory and the user processor along the same transmission direction;

storing a start identifier that indicates a start of transmission to the target destination; and storing a message identifier that indicates whether a transmission is on-going.

7. The method as recited in claim 6, wherein the data are transmitted via the first buffer configuration in two data paths having in each case two data directions, and the first buffer configuration contains a first buffer for a first data path and a second buffer for a second data path, and one first finite state machine is provided per data path, each of the two first finite state machines controlling the access to the message memory via one buffer each, a third access path thereby resulting, and data being accessed on only one of the access paths at the same time here.

8. A system, comprising:

a user computing device:

a communications link providing the user computing device with a connection to a physical layer of a bus-based communication system; and a communications module including a bi-directional interface, a message handler and a message memory;

wherein:

the interface includes a partial buffer bi-directionally connected to the user computing device and a shadow memory bi-directionally connected to a first buffer;

the interface is connected to the message handler by the first buffer;

the communications link is connected to the message handler by a second buffer;

the message handler includes:

a first finite state machine controlling access to the message memory via the first buffer;

a second finite state machine controlling access to the message memory via the second buffer; and a third finite state machine that assigns access to the message memory by uniformly allocating clock-pulse periods in turn amongst the first and the second finite state machines when both finite state machines request access to the message memory during the same access cycle;

a control arrangement is configured such that:

in response to an access request in which a message object is to be transmitted between the message memory and the user computing device via the interface, transmission of the message object to its target destination is postponed until after the message object is fully loaded into the interface; and while the transmission is postponed, further access requests between the message memory and the user computing device along the same transmission direction are disabled;

the message object is initially stored in the partial buffer when the transmitter is the user computing device, and is initially stored in the shadow memory when the transmitter is the message memory, the contents of the partial buffer and the shadow memory being swapped so that the message object is transmitted to its target destination via the one of the partial buffer and the shadow memory to which the target destination has access;

the communications module stores a first pair of data identifiers and a second pair of data identifiers;

a first one of the first pair of data identifiers indicates whether a header portion of the message object is to be transmitted between the user computing device and the partial buffer;

a second one of the first pair of data identifiers indicates whether a data portion of the message object is to be transmitted between the user computing device and the partial buffer;

a first one of the second pair of data identifiers indicates whether the header portion of the message object is to be transmitted between the message memory and to the shadow memory;

a second one of the second pair of data identifiers indicates whether the data portion of the message object is to be transmitted between the message memory and the shadow memory; and the contents of respective ones of the first and the second pair of data identifiers are swapped along with the swapping of the contents of the partial buffer and the shadow memory.

9. A system comprising:

a user computing device;

a communications link providing the user computing device with a connection to a physical layer of a bus-based communication system; and a communications module including a bi-directional interface, a message handler and a message memory;

wherein:

the interface includes a partial buffer bi-directionally connected to the user computing device and a shadow memory bi-directionally connected to a first buffer;

the interface is connected to the message handler by the first buffer;

the communications link is connected to the message handler by a second buffer;

the message handler includes:

a first finite state machine controlling access to the message memory via the first buffer;

a second finite state machine controlling access to the message memory via the second buffer; and a third finite state machine that assigns access to the message memory by uniformly allocating clock-pulse periods in turn amongst the first and the second finite state machines when both finite state machines request access to the message memory during the same access cycle;

a control arrangement is configured such that:
  in response to an access request in which a message object is to be transmitted between the message memory and the user computing device via the interface, transmission of the message object to its target destination is postponed until after the message object is fully loaded into the interface; and
  while the transmission is postponed, further access requests between the message memory and the user computing device along the same transmission direction are disabled; and
the arrangement includes a first register storing a start identifier that indicates a start of transmission to the target destination, and a second register storing a message identifier that indicates whether a transmission is on-going.

10. The system of claim 9, wherein the first buffer is divided into an input buffer and an output buffer, and the first finite state machine is divided into two finite state machines that each separately controls communication via a respective one of the input buffer and the output buffer.

11. The system of claim 9, wherein:
the second buffer is divided into a first channel buffer and a second channel buffer;
each channel buffer is located along a respective bi-directional communication channel connecting the message memory to the communications link; and
the third finite state machine enables communication via only one of the channels at a time.

12. The system of claim 9, wherein the message object is initially stored in the partial buffer when the transmitter is the user computing device, and is initially stored in the shadow memory when the transmitter is the message memory, the contents of the partial buffer and the shadow memory being swapped so that the message object is transmitted to its target destination via the one of the partial buffer and the shadow memory to which the target destination has access.

13. The system of claim 9, wherein a size of a data field in each message object is user-programmable.

14. A system comprising:
a user computing device;
a communications link providing the user computing device with a connection to a physical layer of a bus-based communication system; and
a communications module including a bi-directional interface, a message handler and a message memory;
wherein:
  the interface includes a partial buffer bi-directionally connected to the user computing device and a shadow memory bi-directionally connected to a first buffer;
  the interface is connected to the message handler by the first buffer;
  the communications link is connected to the message handler by a second buffer;
  the message handler includes:
    a first finite state machine controlling access to the message memory via the first buffer;
    a second finite state machine controlling access to the message memory via the second buffer; and
    a third finite state machine that assigns access to the message memory by uniformly allocating clock-pulse periods in turn amongst the first and the second finite state machines when both finite state machines request access to the message memory during the same access cycle;
a control arrangement is configured such that:
  in response to an access request in which a message object is to be transmitted between the message memory and the user computing device via the interface, transmission of the message object to its target destination is postponed until after the message object is fully loaded into the interface; and
  while the transmission is postponed, further access requests between the message memory and the user computing device along the same transmission direction are disabled; and
the arrangement includes a request register storing a pair data identifiers, a first one of the data identifiers indicating whether a header portion the message object is to be transmitted, and a second one of the data identifiers indicating whether a data portion of the message object is to be transmitted.

* * * * *

UNITED STATES PATENT AND TRADEMARK OFFICE
CERTIFICATE OF CORRECTION

PATENT NO. : 8,484,390 B2
APPLICATION NO. : 11/659311
DATED : July 9, 2013
INVENTOR(S) : Hartwich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1614 days.

Signed and Sealed this
Eighth Day of September, 2015

Michelle K. Lee
*Director of the United States Patent and Trademark Office*